(12) United States Patent
Jungwirth

(10) Patent No.: US 9,928,930 B1
(45) Date of Patent: Mar. 27, 2018

(54) LASER ILLUMINATING SYSTEM AND METHOD FOR SELECTIVELY ILLUMINATING A ZONE OF COVERAGE

(71) Applicant: The Boeing Company, Chicago, IL (US)

(72) Inventor: Douglas R. Jungwirth, Porter Ranch, CA (US)

(73) Assignee: The Boeing Company, Chicago, IL (US)

( * ) Notice: Subject to any disclaimer, the term of this patent is extended or adjusted under 35 U.S.C. 154(b) by 58 days.

(21) Appl. No.: 13/749,866

(22) Filed: Jan. 25, 2013

(51) Int. Cl.
  *G21K 5/10* (2006.01)
  *G21K 5/04* (2006.01)
  *F21V 21/00* (2006.01)
  *F21V 8/00* (2006.01)

(52) U.S. Cl.
  CPC .............. *G21K 5/04* (2013.01); *F21V 21/00* (2013.01); *G02B 6/0008* (2013.01)

(58) Field of Classification Search
  None
  See application file for complete search history.

(56) References Cited

U.S. PATENT DOCUMENTS

| | | | |
|---|---|---|---|
| 7,483,454 B2 * | 1/2009 | Hauck | F41H 13/0056 362/231 |
| 7,497,586 B2 * | 3/2009 | Eisenberg | F41H 13/0087 362/109 |
| 7,794,102 B2 * | 9/2010 | Shemwell | F41H 5/08 362/109 |
| 7,866,082 B2 * | 1/2011 | Eisenberg | F41H 13/0087 362/109 |
| 7,921,588 B2 * | 4/2011 | Brown | G08B 15/00 42/114 |
| 7,980,720 B2 * | 7/2011 | Shemwell | F41H 5/08 362/109 |
| 8,051,761 B1 * | 11/2011 | Ullman | F41H 3/00 359/196.1 |
| 8,351,659 B2 * | 1/2013 | D'Souza | G06K 9/00771 382/103 |
| 2006/0234191 A1 * | 10/2006 | Ludman | F41G 1/35 434/11 |
| 2008/0295677 A1 * | 12/2008 | Real | F41H 13/0056 89/1.1 |
| 2009/0080712 A1 * | 3/2009 | D'Souza | G06K 9/00597 382/117 |
| 2013/0016514 A1 * | 1/2013 | Stacey | F41H 13/0056 362/253 |
| 2013/0099096 A1 * | 4/2013 | Hutchin | F41G 3/147 250/208.1 |

* cited by examiner

*Primary Examiner* — Andrew Smyth
(74) *Attorney, Agent, or Firm* — Walters & Wasylyna LLC

(57) ABSTRACT

A laser illumination system including two or more lasers, each laser being configured to selectively project an associated laser beam having an associated wavelength, and a projection assembly positioned to receive and combine the laser beams and project an outgoing beam toward a selected bearing.

20 Claims, 7 Drawing Sheets

LASER ILLUMINATING SYSTEM AND METHOD FOR SELECTIVELY ILLUMINATING A ZONE OF COVERAGE

FIELD

The present disclosure is generally related to laser systems and, more particularly, to a laser illuminating system for selectively illuminating a zone of coverage with laser illumination having a combination of wavelengths.

BACKGROUND

In many military, law enforcement, and civilian applications there may be a need to quickly identify a target and distinguish the target between an enemy target and a friendly target. For example, there may be a need to detect and identify a target that has been camouflaged, is operating at night or in weather that impairs visibility, or to accurately designate a target at distance.

In such applications there may also be a need to impair the visibility of a target. For example, there may be a need to prevent people or optical sensors from obtaining a clear image or to obtain a location of assets in a protected area. There may also be a need to disrupt visibility or electronic sensors in a targeted area prior to an operational action.

The utilization of laser systems for remote target designation and visibility disruption has been in use for many years. The laser system projects a laser beam having a particular wavelength at a target. The particular wavelength used may determine the operational function of the system, such as laser designation or visibility dazzling. However such laser systems are limited to a particular function based on the wavelength of the laser beam used. Additionally, the laser systems are limited to a single target. As operational pace increases, so does the need for quick and accurate identification of potential targets and the need for multiple operational functions.

Accordingly, those skilled in the art continue with research and development efforts in the field of laser illumination systems.

SUMMARY

In one embodiment, the disclosed laser illumination system may include two or more lasers, each laser being configured to selectively project an associated laser beam having an associated wavelength, and a projection assembly positioned to receive and combine the laser beams and project an outgoing beam toward a selected bearing. At least two (if not all) of the wavelengths may be different.

In another embodiment, the disclosed laser illumination system may include a plurality of lasers, wherein the plurality of lasers project a plurality of laser beams, each of the plurality of laser beams having a different wavelength, and a projection assembly positioned to receive a combination of the plurality laser beams and project an outgoing beam toward a selected bearing, the projection assembly including a first axis of rotation and a second axis of rotation, wherein the outgoing beam is rotatable about the first and second axes of rotation to direct the outgoing beam toward the selected bearing.

In another embodiment, the disclosed laser illumination system may include projection assembly including a scanning mirror positioned to receive a combination of a plurality of laser beams and deflect the combination of the plurality of laser beams as an outgoing beam.

In yet another embodiment, disclosed is a method for selectively illuminating a target area with a laser beam, the method may include the steps of: (1) determining a location and orientation of a laser illumination system, (2) designating a target area within a zone of coverage, (3) determining a location of the target area, (4) determining a bearing to the target area relative to the location and orientation of the laser illumination system, (5) directing the laser illumination system at the bearing, (6) triggering a selected combination of a plurality of lasers, (7) projecting a selected combination of a plurality laser beams, wherein each of the laser beams incudes a different wavelength, (8) forming an outgoing beam including the selected combination of the plurality of laser beams, and (9) projecting the outgoing beam at the bearing to illuminate the target area.

Other aspects of the disclosed laser illumination system will become apparent from the following detailed description, the accompanying drawings and the appended claims.

DETAILED DESCRIPTION

Figure 1:
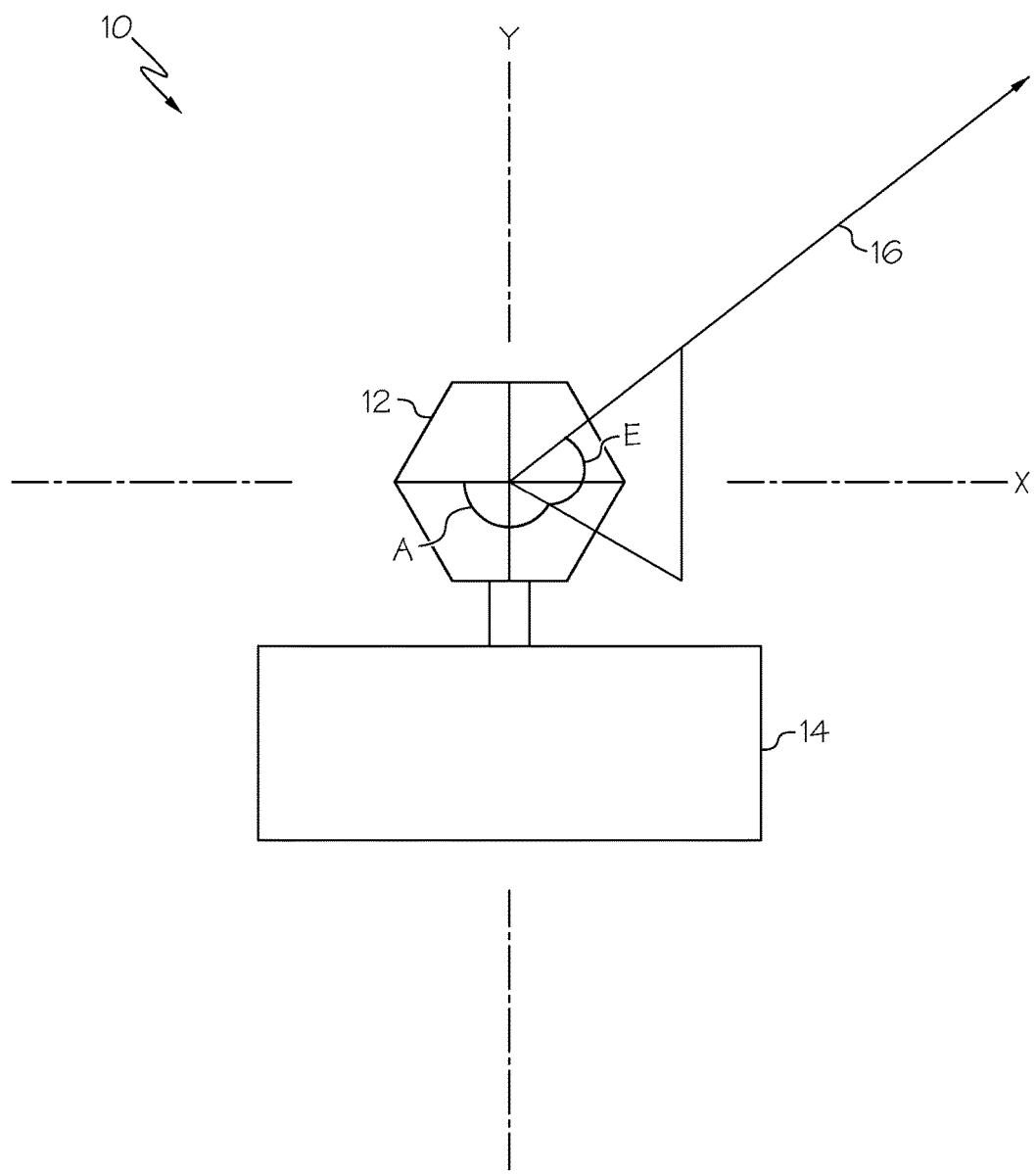
FIG. 1 is a schematic representation of one embodiment of the disclosed laser illumination system.

The following detailed description refers to the accompanying drawings, which illustrate specific embodiments of the disclosure. Other embodiments having different structures and operations do not depart from the scope of the present disclosure. Like reference numerals may refer to the same element or component in the different drawings.

Referring to FIG. 1, the laser illumination system, generally designated "system" 10, may include projection assembly 12 connected to a platform 14. The platform 14 may include any mobile or stationary support member, such as a land vehicle, an aircraft, a building, a human carrier (e.g., a portable system), or the like. The projection assembly 12 may project an outgoing beam 16 directed at a determined bearing to illuminate a designated target or target area. As will be described in further detail below, the outgoing beam 16 may include a selected wavelength or a plurality of wavelengths depending on an operational function of the outgoing beam 16.

The projection assembly 12 may include a first axis of rotation Y (i.e., azimuth axis) and a second axis of rotation X (i.e., elevation axis). Rotation of the outgoing beam 16 about the first axis of rotation Y may provide a bearing having 360-degree field of view (i.e., azimuth angle A). Rotation of the outgoing beam 16 about the second axis of rotation X may provide a bearing having at least a 90-degree field of view (i.e., elevation angle E). Thus, rotation of the outgoing beam 16 about the first axis of rotation Y and the second axis of rotation X may allow the outgoing beam 16 to be directed at any location within at least a hemispherical zone of coverage 20 (FIG. 2).

It is contemplated that two or more systems 10 may be utilized in unison to cover significant areas or areas which may be blocked by line of sight of a single system 10. It is also contemplated that the projection system 12 may rotate about the second axis of rotation X to provide at least a 180-degree field of view for the outgoing beam 16, thus providing a spherical zone of coverage.

Figure 2:
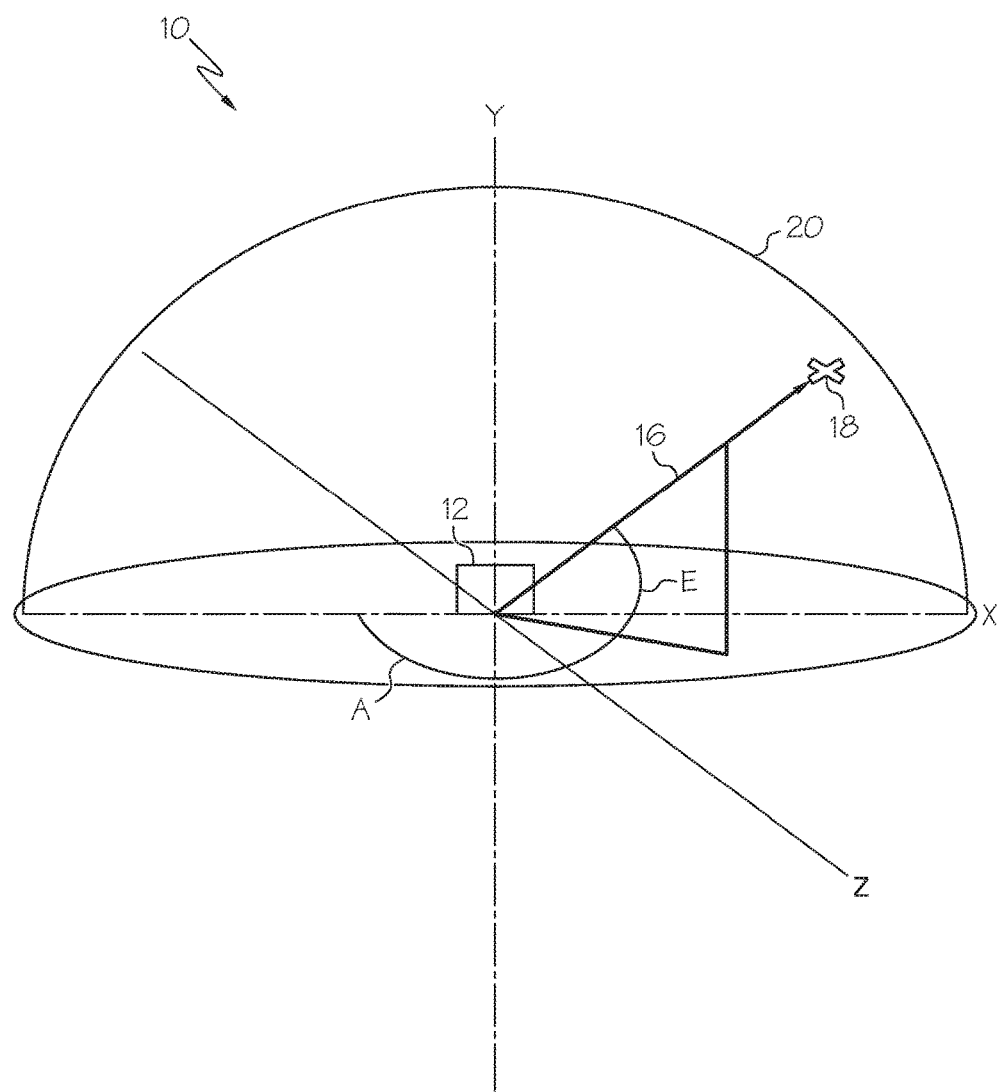
FIG. 2 is a schematic representation of one implementation of the disclosed laser illumination system.

Referring to FIG. 2, in one expression of the system 10, the outgoing beam 16 may be continuously directed toward the designated target. Discrete rotation of the projection assembly 12 about the first axis of rotation Y and the second axis of rotation X may allow the outgoing beam 16 to be directed at any particular spatial coordinate 18 (e.g., designated target) within the zone of coverage 20. For example, the bearing (i.e., azimuth angle A and elevation angle B) of the outgoing beam 16 may be determined by the location of the spatial coordinate 18 relative to the location of the system 10. The projection assembly 12 may be discretely rotated about the first axis of rotation Y to a determined azimuth angle A and discretely rotated about the second axis of rotation X to a determined elevation angle E in order to direct the outgoing beam 16 on a bearing toward the spatial coordinate 18.

Figure 3:
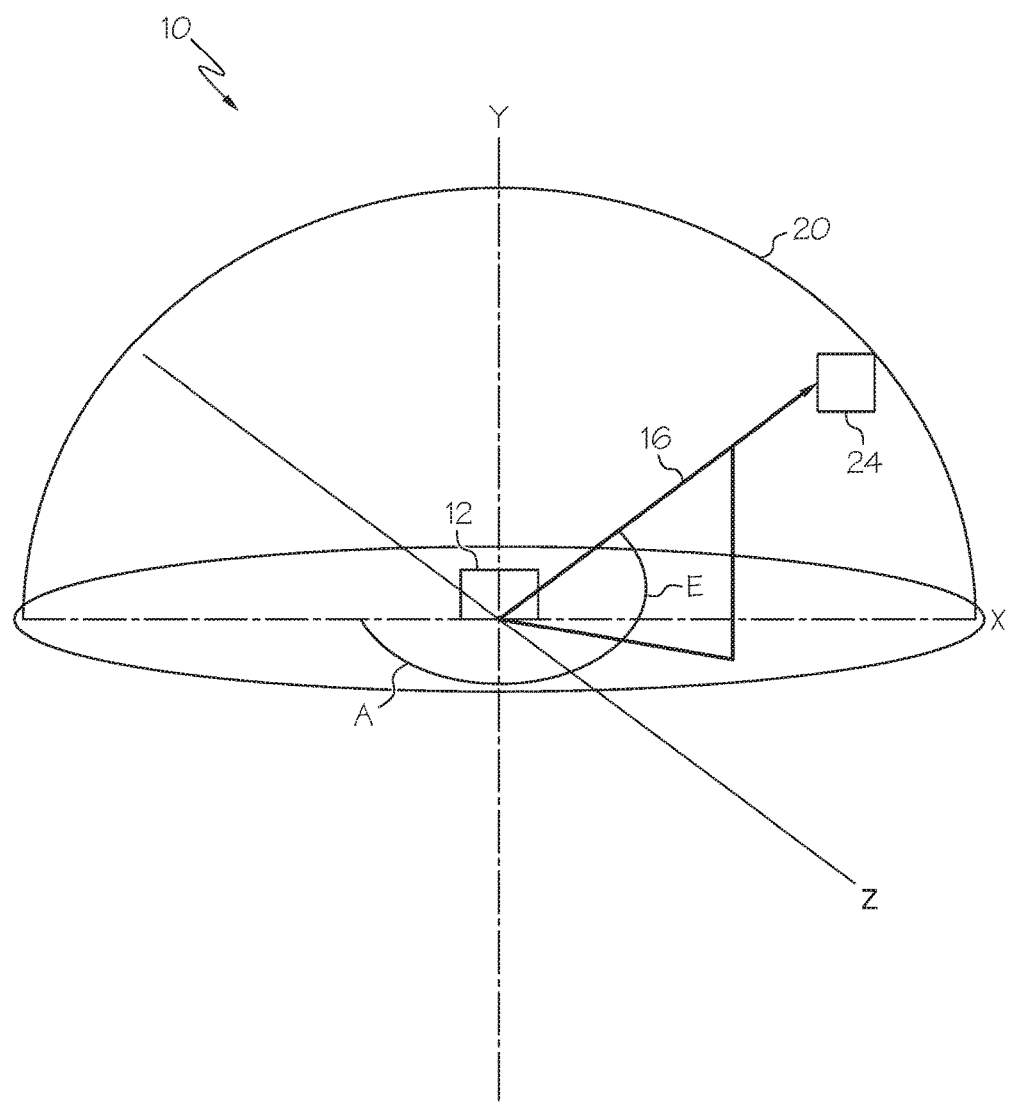
FIG. 3 is a schematic representation of another implementation of the disclosed laser illumination system.

Referring to FIG. 3, in another expression of the system 10, reciprocal rotation of the projection assembly 12 about the first axis of rotation Y and the second axis of rotation X may allow the outgoing beam 16 to scan a scan zone 24 (e.g., target zone) within the zone of coverage 20. For example, the projection assembly 12 may be reciprocally rotated about the second axis of rotation X between at least a pair of determined elevation angles E and reciprocally rotated about the first axis of rotation Y between at least a pair of determined azimuth angles A in order to direct the outgoing beam 16 along a pattern defined by the scan zone 24.

Figure 4:
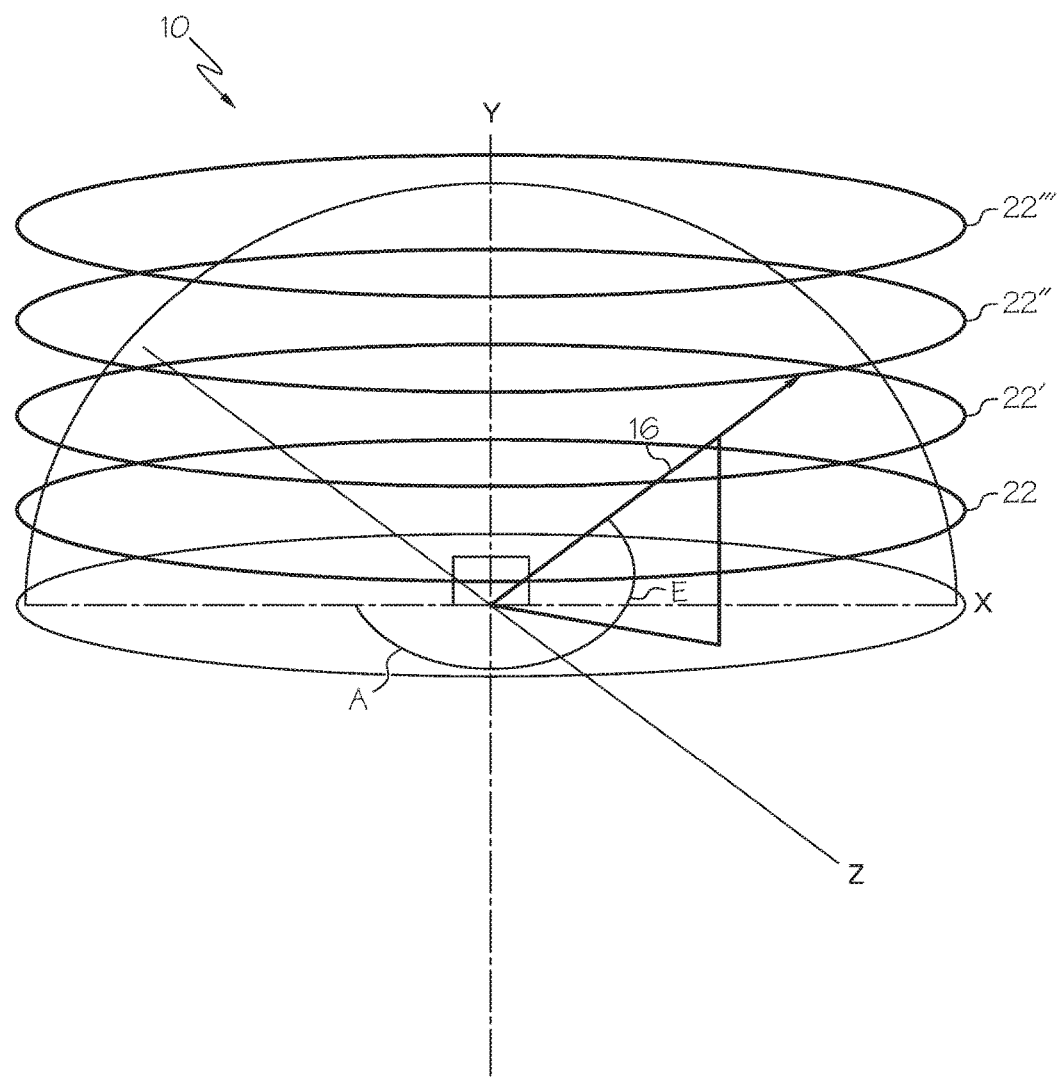
FIG. 4 is a schematic representation of another implementation of the disclosed laser illumination system.

Referring to FIG. 4, in another expression of the system 10, the outgoing beam 16 may be directed along a programmed pattern. Continuous rotation of the projection assembly 12 about the first axis of rotation Y and the second axis of rotation X may allow the outgoing beam 16 to scan a scan path 22 (e.g., target zone) within the zone of coverage 20. For example, the projection assembly 12 may be discretely rotated about the second axis of rotation X to a determined elevation angle E and continuously rotated about the first axis of rotation Y in order to continuously direct the outgoing beam 16 along the scan path 22. The projection assembly 12 may be discretely rotated about the second axis of rotation X to a second determined elevation angle E and continuously rotated about the first axis of rotation Y in order to continuously direct the outgoing beam 16 along a second scan path 22'. The projection assembly 12 may be discretely rotated about the second axis of rotation X to a third determined elevation angle E and continuously rotated about the first axis of rotation Y in order to continuously direct the outgoing beam 16 along a third scan path 22". It can be appreciated by one skilled in the art that readjustment of the elevation angle E while the projection assembly 12 rotates about the first axis of rotation Y may provide any number of scan paths 22, 22', 22", 22''', etc. within the zone of coverage 20.

Corrections to the bearing of the outgoing beam 16 may be made by adjusting the azimuth angle A and elevation angle E at any time in response to the position and orientation of the system 10 and the location of the designated target or target area.

Figure 5:
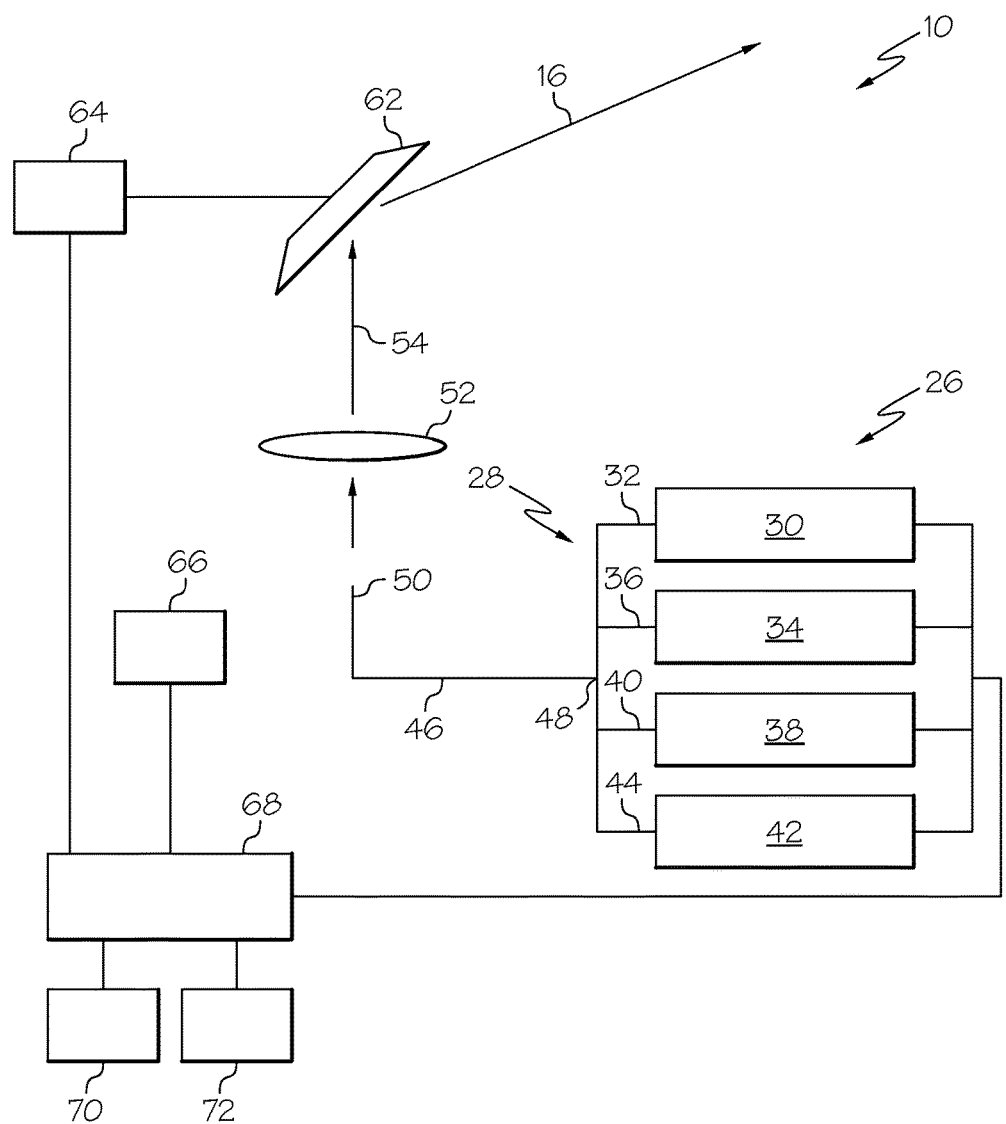
FIG. 5 is a schematic block diagram of one embodiment of the disclosed laser illumination system.

Referring to FIG. 5, the system 10 may include a plurality of lasers 26. The lasers 26 may project a plurality of laser beams 28, wherein each laser beam 28 includes a stream of rays having a wavelength intended for a defined operational function. For example, the system 10 may include a first laser 30 projecting a first laser beam 32 having a first wavelength, a second laser 34 projecting a second laser beam 36 having a second wavelength, a third laser 38 projecting a third laser beam 40 having a third wavelength, a fourth laser 42 projecting a fourth laser beam 44 having a fourth wavelength, etc.

In an implementation of the system 10, the first laser beam 32 may include a suitable wavelength to temporarily blind (i.e., dazzle) a target, such as an electronics sensor with invisible (e.g., infrared) light. The second laser beam 36 may include a suitable wavelength to temporarily blind a human target with visible light. The third laser beam 40 may include a suitable wavelength for use as a laser designator (e.g., target illumination) to guide laser-guided munitions to an enemy target or otherwise designate the target as enemy. The fourth laser beam 44 may include a suitable wavelength for use as a laser designator to identify friendly forces in an area. It is contemplated that the system 10 may include only a single laser or additional lasers for producing laser beams having other wavelengths for mission specific operational functions, for example infrared designator for night vision or infrared viewing equipment, laser measuring, laser tracking, or laser sensors.

At least one optical fiber 46 may be aligned with the lasers 26 to guide the laser beams 28. For example, the optical fiber 46 may include a first end 48 connected to an output of the lasers 26 to collect the laser beams 28 and a second end 50. The laser beams 28 may be transmitted from the first end 48 to the second end 50 along the optical fiber 46. A collimator 52 may be positioned to receive the laser beams 28 exiting the second end 50.

The collimator 52 may receive and narrow the laser beams 28 and project a collimated beam 54. The collimator 52 may include any suitable collimator, such as a collimating lens, collimating crystal, or the like to form the collimated beam 54. In one expression, the collimated beam 54 may include a plurality of aligned (i.e., parallel) light rays. In another implementation, the collimated beam 54 may include a plurality of converging light rays.

Figure 6:
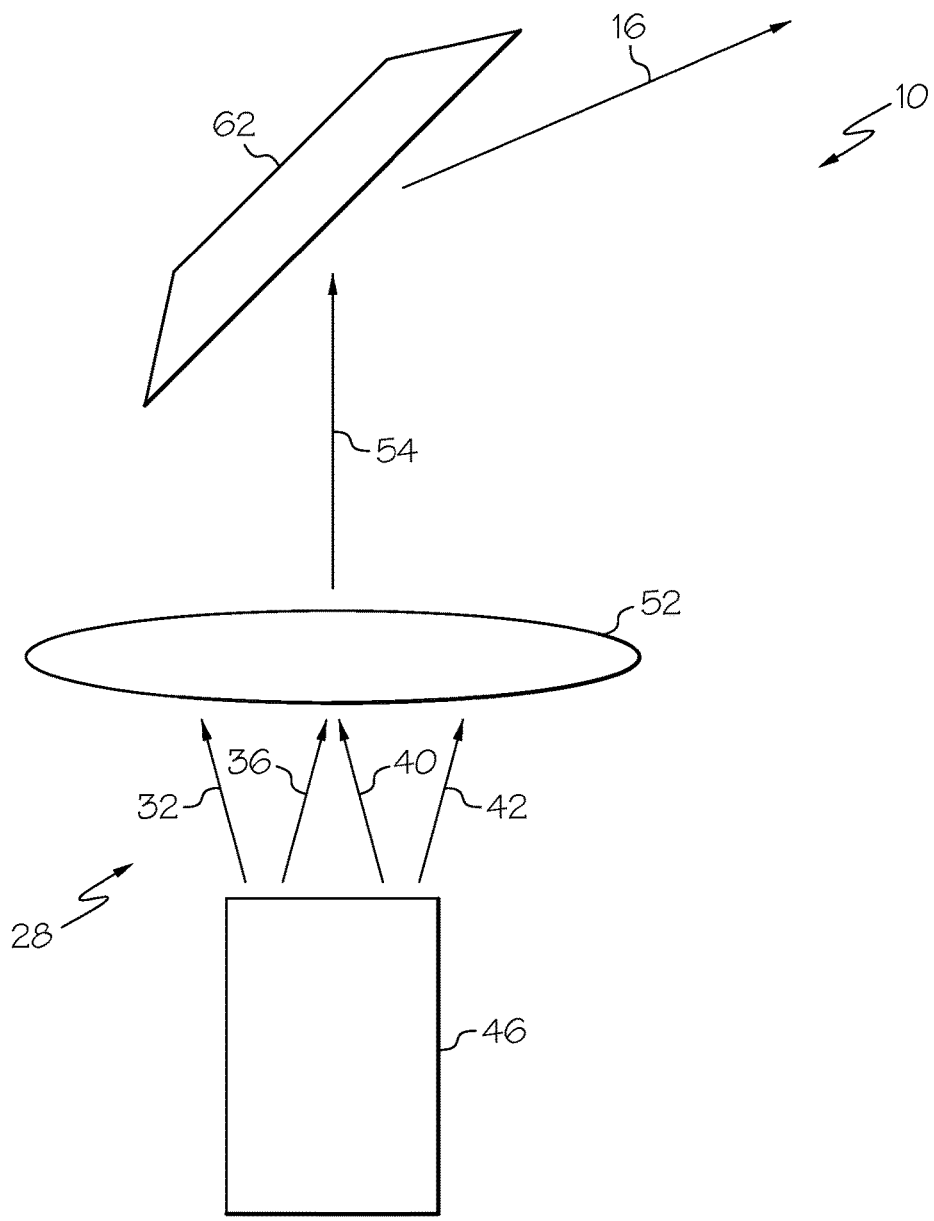
FIG. 6 is a schematic representation of one embodiment of a projection assembly of the disclosed laser illumination system.

Referring to FIG. 6, the collimator 52 may receive the first laser beam 32, the second laser beam 36, the third laser beam 40, and the fourth laser beam 44 from the second end 50 of the optical fiber 46, wherein each laser beam 32, 36, 40, 44 includes a different wavelength. After passing through the collimator 52, the collimated beam 54 includes all of the different wavelengths of the source laser beams 32, 36, 40, 44.

It can be appreciated by one skilled in the art that the wavelengths included within the collimated beam 54 depend upon which laser 26 or combination of lasers 26 are activated at a given time. As an example, when the first laser 30 and third laser 38 are activated, the collimated beam 54 may include wavelengths from the first laser beam 32 and third laser beam 40. As another example, when the second laser 34 and third laser 38 are activated, the collimated beam 54 may include wavelengths from the second laser beam 36 and third laser beam 40. As another example, when the second laser 34, third laser 38, and fourth laser 42 are activated the collimated beam 54 may include wavelengths from the second laser beam 36, third laser beam 40, and the fourth laser beam 44.

Referring back to FIG. 5, the system 10 may include a two-dimensional scanning mirror 62 positioned to receive the collimated beam 54 and reflect the outgoing beam 16. The scanning mirror 62 allows for steerable deflection of the collimated beam 54 to direct the outgoing beam 16 at a specified bearing. A drive assembly 64 may actuate the scanning mirror 62. The drive assembly 64 may be configured to rotate the scanning mirror 62 at high speeds, thus steering the outgoing beam 16.

It can be appreciated by one skilled in the art that the outgoing beam 16 may include a plurality of wavelengths having the same wavelength or combination of wavelengths as the collimated beam 54. Thus, at any given time based on the combination of activated lasers 26, the outgoing beam 16 may include a variety of wavelengths for a specific operational function.

The scanning mirror 62 (or both the scanning mirror 62 and the collimator 52) may be housed in the projection assembly 12 (FIG. 1). The projection assembly 12 may include an exterior shell to protect the mirror assembly from environmental effects. The shell of the projection assembly 12 may be made of a transparent material that will not interfere or obstruct the outgoing beam 16.

In an embodiment of the system 10, the scanning mirror 62 may be stationary within the projection assembly 12, such that the bearing (i.e., direction of deflection) of the outgoing beam 16 is determined by rotation of the projection assembly 12 about the first axis of rotation Y and the second axis of rotation X. Rotation of the projection assembly 12 about the first axis of rotation Y and the second axis of rotation X may allow the outgoing beam 16 to be directed at any location within the zone of coverage 20. The drive assembly 64 may be mechanically connected to the projection assembly 12 to rotate about the first axis of rotation Y and the second axis of rotation X.

In another embodiment, scanning mirror 62 may rotate about one axis within the projection assembly 12. The scanning mirror 62 may include the second axis of rotation X (i.e., elevation axis) and the projection assembly 12 may include the first axis of rotation Y (i.e., azimuth axis). Rotation of the projection assembly 12 about the first axis of rotation Y may provide a 360-degree field of view (i.e., azimuth angle A) for the outgoing beam 16. Rotation of the scanning mirror 62 about the second axis of rotation X may provide at least a 90-degree field of view (i.e., elevation angle E) for the outgoing beam 16. Rotation of the projection assembly 12 about the first axis of rotation Y and scanning mirror 62 about the second axis of rotation X may allow the outgoing beam 16 to be directed at any location within the zone of coverage 20. The drive assembly 64 may be mechanically connected to the projection assembly 12 to rotate about the first axis of rotation Y and mechanically connected to the scanning mirror 62 to rotate about the second axis of rotation X.

In yet another embodiment, the scanning mirror 62 may rotate about two axes within the projection assembly 12. The scanning mirror 62 may include the first axis of rotation Y (i.e., azimuth axis) and the second axis of rotation X (i.e., elevation axis). Rotation of the scanning mirror 62 about the first axis of rotation Y may provide a 360-degree field of view (i.e., azimuth angle A) for the outgoing beam 16. Rotation of the scanning mirror 62 about the second axis of rotation X may provide at least a 90-degree field of view (i.e., elevation angle E) for the outgoing beam 16. Rotation of the scanning mirror 62 about the first axis of rotation Y and the second axis of rotation X may allow the outgoing beam 16 to be directed at any location within the zone of coverage 20 (FIG. 2). The drive assembly 64 may be mechanically connected to the scanning mirror 62 to rotate about the first axis of rotation Y and the second axis of rotation X.

Thus, the two-dimensional scanning mirror 62 may rotate along two axes, either by rotation of the projection assembly 12 or rotation of the scanning mirror 62 or a combination of both to deflect the outgoing beam 16 toward a target.

In an implementation, the two-dimensional scanning mirror 62 may include a single mirror. In another implementation, the two-dimensional scanning mirror 62 may include two closely spaced mirrors that are mounted on orthogonal axes. The mirrors may be flat or polygonal mirrors. The drive assembly 64 may include at least one mechanical driver, such as an electrical motor, a servomotor, a stepper motor, a galvanometer, or the like and drive electronics.

Referring still to FIG. 5, at least one position sensor 66, for example an angle sensor, may be in communication with the scanning mirror 62. The sensor 66 may detect the azimuth angle A and elevation angle E of the outgoing beam 16, based upon the angular position of the scanning mirror 62 relative to the axes of rotation. Position information of the scanning mirror 62 may be transmitted from the sensor 66 to a controller 68. The controller 68 may include at least one computer processor and command software.

The relative position (i.e., location) of the system 10 may be determined by a positioning system 70 that may be integrated into the controller 68. The positioning system 70 may include the Global Positioning System (GPS), an inertial navigation system (INS), or the like. The controller 68 may use the input information from the sensor 66 and the positioning system 70 to determine the bearing of the outgoing beam 16. The position of the designated target or target area may be determined and/or tracked by a target acquisition system 72.

The controller 68 may be connected to the drive assembly 64. When the location of a target has been identified by the target acquisition system 72, the controller 68 may transmit angular driver information to the drive assembly 64 to correctly position the scanning mirror 62 at a defined azimuth angle A and elevation angle E, such that the outgoing beam 16 is directed on a bearing toward the target (e.g., spatial coordinate), within a target area (e.g., scan zone), or along a target path (e.g., scan path).

The controller 68 may be connected to the lasers 26. The controller 68 may transmit triggering commands to the lasers 26 to activate one or more of the lasers 26 based upon a particular operational function associated with the target and the time the scanning mirror 62 is directed toward the target. The controller 68 defines and directs which laser beams 28 may be directed to a given spatial coordinate 18 (FIG. 3), scan zone 24 (FIG. 5), or scan path 22 (FIG. 4).

For example, the scanning mirror 62 may be positioned toward a given spatial coordinate and the controller 68 may trigger a combination of a first and second laser to impair visibility and disable electronic surveillance of the target and a third laser to designate a target for laser-guided munitions. The outgoing beam 16 directed toward the target may include a combination of wavelengths from the first, second and third laser beams. Friendly forces may be issued goggles that block the wavelengths of the first and second laser beams, so they are not affected. Friendly forces will be able to see the wavelength of third laser beam to attack the target, but will not be impaired by first and second laser beams.

As another example, the scanning mirror 62 may rotate within a given scan zone and the controller 68 may trigger a combination of a first and second laser to impair visibility and disable electronic surveillance throughout the programmed pattern of the given scan zone and trigger a third laser only when the scanning mirror is directed toward a given spatial coordinate to designate a target for attack. The outgoing beam 16 scanning the scan zone may include a combination of wavelengths from the first and second laser beams and a combination of wavelengths from the first, second and third laser beams when directed toward the target.

As another example, the scanning mirror 62 may rotate along one or more given scan paths and the controller 68 may trigger a combination of a first and second laser to impair visibility and disable electronic surveillance throughout at least a portion of the given scan path, trigger a third laser only when the scanning mirror is directed toward a given first spatial coordinate to designate the target for attack, and trigger a fourth laser only when the scanning mirror is directed toward a given second spatial coordinate to designate friendly forces. The outgoing beam 16 scanning the scan path may include a combination of wavelengths from the first and second laser beams, a combination of wavelengths from the first, second and third laser beams when directed toward the target, and a combination of wavelengths from the first, second and fourth laser beams when directed toward friendly forces. Additionally, the first and second lasers may be deactivated along a certain portion of the scan path (i.e., no outgoing beam directed to a designated area) to protect friendly forces that lack proper optical protection (e.g., goggles).

Figure 7:
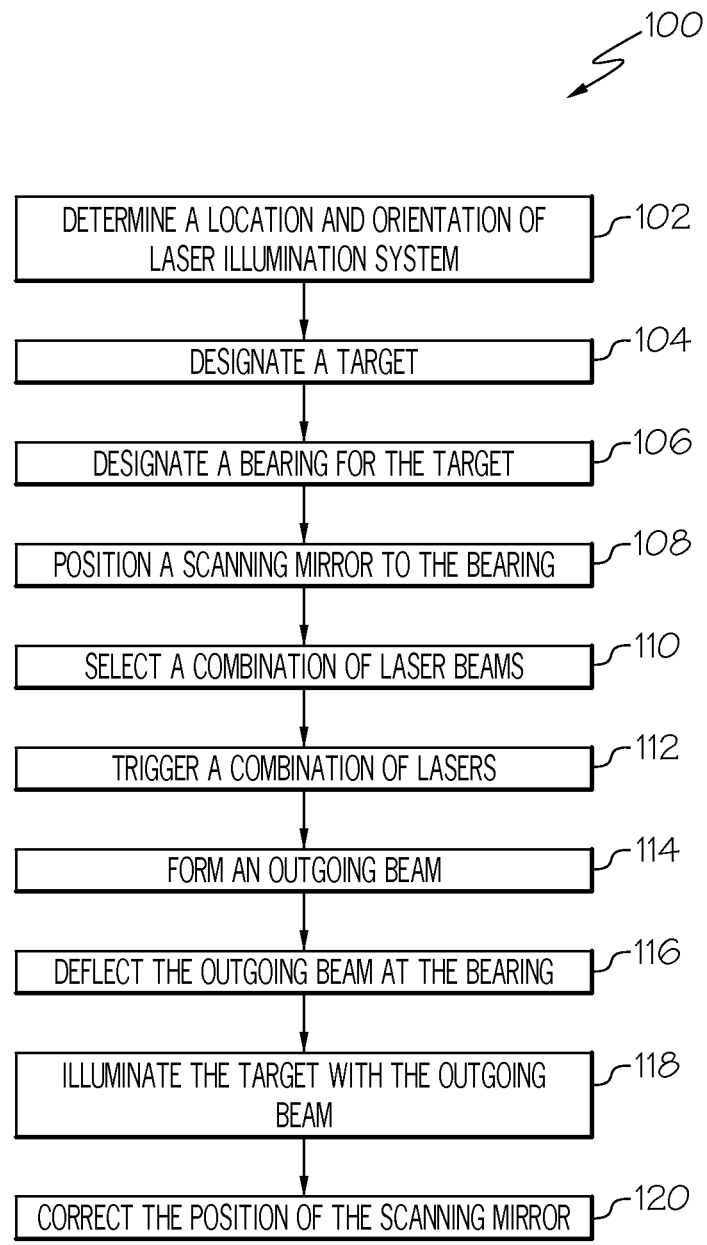
FIG. 7 is flow chart depicted one embodiment of the disclosed method for selectively illuminating a target area with a laser beam.

Referring to FIG. 7, also disclosed is a method, generally designed 100, for selectively illuminated a zone of coverage. The method 100 may begin at block 102 with the step of determining a location and orientation of a laser illumination system within a zone of coverage. The position of the laser illumination system may be determined through a combination of inputs, such as location input from a GPS, orientation input from an INS, and scanning mirror position input from at least one position sensor.

As shown at block 104, a target (e.g., spatial coordinate) or target area (e.g., scan zone or scan path) may be designated within the zone of coverage. As shown at block 106, a bearing (i.e., the azimuth angle and elevation angle) of the designated target or target area may be plotted relative to the location and orientation of the system.

As shown at block 108, the scanning mirror may be positioned to the bearing by rotation about a first axis of rotation and a second axis of rotation in azimuth angle and elevation angle to be directed toward the designated target or may rotate along the programmed pattern within the designated target zone.

For example, when connected to a stationary platform, the scanning mirror may remain stationary to maintain a position directed toward the designated target. When connected to a mobile platform, the scanning mirror may rotate about either the first axis of rotation, the second axis of rotation, or a combination of both to adjust position in response to the motion of the platform to maintain a position directed toward the designated target. When connected to a stationary platform, the scanning mirror may cycle through a defined rotation to maintain a position directed toward the designated target area. When connected to a mobile platform, the scanning mirror may cycle through a defined rotation and rotate about either the first axis of rotation, the second axis of rotation, or a combination of both to adjust position in response to the motion of the platform to maintain a position directed toward the designated target area.

As shown at block 110, a selected combination of laser beams may be determined based upon a defined operational function of the outgoing beam.

As shown at block 112, a combination of lasers may be triggered when the scanning mirror is directed to a defined azimuth angle and elevation angle corresponding to the designated target or target area and selected combination of laser beams. A defined combination of laser beams may be triggered to produce a defined combination of laser beams, each laser beam may include a wavelength corresponding to a specific operational function, such as to visually or electronically blind the target, designate the target as enemy for attack, designate the target as a friendly position, or the like.

The defined combination of laser beams may be dependent upon the defined operational function or combination of operational functions of the outgoing beam. The defined combination of laser beams may vary at any given azimuth angle or elevation angle depending upon the position of the designated target or target area relative to the rotational position of the scanning mirror. For example, a first combination of laser beams may be triggered to disrupt vision or sensors within a scan zone or scan path, while a second combination of laser beams may be triggered to disrupt vision or sensors and illuminate (i.e., designate) a target only at a defined spatial coordinate.

As shown at block 114, an outgoing beam may be formed by the defined combination of laser beams. The defined combination of laser beams may be directed through a collimator and reflected off of the scanning mirror to produce the outgoing beam having a combination of wavelengths corresponding to the wavelengths of the defined combination of laser beams. As shown at block 116, the outgoing beam may be deflected from the scanning mirror and projected on a bearing matching the defined azimuth angle and elevation angle of the target or target area.

As shown at block 118, the outgoing beam may illuminate the designated target or target area. The target area may reside within a programmed scan pattern (e.g., scan zone or scan path) for the outgoing beam. The programmed pattern may include time duration, bearing direction (i.e., azimuth angle and elevation angle), defined wavelengths of the outgoing beam, and power of the combination of lasers.

As shown at block 120, the azimuth angle and elevation angle of the scanning mirror may be corrected in response to movement of the platform or updated location information of the target or target area. Adjustment of the position of the scanning mirror maintains the outgoing beam on a correct bearing directed toward the target or target area.

Accordingly, the disclosed system 10 (FIG. 5) may actively illuminate any viewable area with a defined combination of laser beams 28 (FIG. 5). The defined combination of laser beams 28 may continuously illuminate the viewable area or selectively illuminate the viewable area based on an operational function. The disclosed system 10 may project an outgoing beam 16 (FIG. 5) including a plurality of different wavelength laser beams 28 over the large field of view (e.g., zone of coverage 20 shown in FIG. 2) at a plurality of directions (e.g., bearings) due to the high-speed rotation of the scanning mirror 62 (FIG. 5).

Although various embodiments of the disclosed laser illumination system have been shown and described, modifications may occur to those skilled in the art upon reading the specification. The present application includes such modifications and is limited only by the scope of the claims.

What is claimed is:

1. A passive laser illumination system comprising:
a plurality of lasers configured to selectively emit a plurality of laser beams, said plurality of laser beams comprising different wavelengths, each of said wavelengths corresponding to one of an enemy operational function or a friendly operational function;
a projection assembly configured to: receive an operational selection of at least one laser beam of said plurality of laser beams from said plurality of lasers; project said operational selection of at least one laser beam as an outgoing beam; and move said outgoing beam along a continuous scan path;
a positioning system configured to provide a spatial location of said projection assembly and a bearing of said outgoing beam as said outgoing beam is moved along said continuous scan path; and
a controller communicatively coupled with said plurality of lasers and said positioning system, wherein said controller is configured to:
receive a plurality of predetermined spatial coordinates located along said continuous scan path, each of said plurality of predetermined spatial coordinates being predesignated as one of an enemy target, assigned with at least one enemy operational function, or a friendly target, assigned with at least one friendly operational function;
as said outgoing beam moves along said continuous scan path, automatically select said operational selection of at least one laser beam as said at least one enemy operational function when said bearing of said outgoing beam is directed at ones of said plurality of predetermined spatial coordinates predesignated as said enemy location; and
as said outgoing beam moves along said continuous scan path, automatically select said operational selection of at least one laser beam as said at least one friendly operational function when said bearing of said outgoing beam is directed at other ones of said plurality of predetermined spatial coordinates predesignated as said friendly location.

2. The system of claim 1 wherein said projection assembly defines a first axis of rotation and a second axis of rotation, and wherein said outgoing beam is moveable about said first and said second axes of rotation.

3. The system of claim 2 wherein said projection assembly comprises a drive assembly to selectively move said outgoing beam about said first and said second axes of rotation along said continuous scan path.

4. The system of claim 1 further comprising an optical fiber positioned to receive said selection of at least one laser beam and guide said selection of at least one laser beam toward said projection assembly.

5. The system of claim 1 wherein said projection assembly comprises a collimator positioned to receive and collimate said selection of at least one laser beam and output a collimated outgoing beam.

6. The system of claim 1 wherein said positioning system comprises at least one sensor to determine an azimuth angle and an elevation angle of said outgoing beam.

7. The system of claim 1 wherein said selection of at least one laser beam comprises at least one wavelength corresponding to one of said at least one enemy operational function assigned to one of said plurality of predetermined spatial coordinates predesignated as said enemy target or said at least one friendly operational function assigned to another one of said plurality of predetermined spatial coordinates predesignated as said friendly target.

8. The system of claim 1 wherein said projection assembly further comprises:
an optical fiber positioned to receive said selection of at least one laser beam from said plurality of lasers and guide said selection of at least one laser beam;
a collimator positioned to receive said selection of at least one laser beam from said optical fiber and output a collimated selection of at least one laser beam; and
a scanning mirror positioned to receive said collimated selection of at least one laser beam and deflect said collimated selection of at least one laser beam as a collimated outgoing beam.

9. The system of claim 1 wherein:
said each of said plurality of predetermined spatial locations is at a different location along said continuous scan path.

10. The system of claim 8 wherein said projection assembly further comprises:
a drive assembly coupled to said scanning mirror; and
at least one sensor in communication with said scanning mirror to determine an azimuth angle and an elevation angle of said outgoing beam.

11. The system of claim 10 wherein said controller is communicatively coupled with said drive assembly and said at least one sensor to selectively move said outgoing beam along said continuous scan path.

12. A method of passive laser illumination, said method comprising the steps of:
determining a spatial location of a laser illumination system;
receiving a plurality of predetermined spatial locations located along a continuous scan path for an outgoing beam projected by said laser illumination system, each of said plurality of predetermined spatial locations being predesignated as one of an enemy target, assigned with at least one enemy operational function, or a friendly target, assigned with at least one friendly operational function;
moving said outgoing beam along said continuous scan path;
as said outgoing beam moves along said continuous scan path, automatically selecting an operational selection of at least one laser beam as said at least one enemy operational function when said bearing of said outgoing beam is directed at ones of said plurality of predetermined spatial coordinates predesignated as said enemy location; and
as said outgoing beam moves along said continuous scan path, automatically selecting said operational selection of at least one laser beam as said at least one friendly operational function when said bearing of said outgoing beam is directed at other ones of said plurality of predetermined spatial coordinates predesignated as said friendly location.

13. The method of claim 12 wherein said continuous scan path comprises a scan pattern for said outgoing beam, and wherein said scan pattern comprises a duration of time, and at least two spatial coordinates.

14. The method of claim 12 further comprising: emitting said operational selection of at least one laser beam from a plurality of lasers of said laser illumination system; and deflecting said operational selection of at least one laser beam off of a two-dimensional scanning mirror as said outgoing beam.

15. The method of claim 12 further comprising maintaining said outgoing beam along said continuous scan path in response to a change in said spatial location of said laser illumination system.

16. The method of claim 12, wherein:
   said each of said plurality of predetermined spatial locations is at a different location along said continuous scan path, and
   said at least one enemy operational function is different for at least one of said plurality of predetermined spatial locations predesignated as said enemy target, and
   said at least one friendly operational function is different for at least another one of said plurality of predetermined spatial locations predesignated as said friendly target.

17. The system of claim 1 wherein said enemy operational function comprises at least one of dazzling optical equipment, disabling electronic surveillance equipment, impairing visibility, designating as an enemy force and designating as an enemy location, and wherein said friendly operational function comprises designating as a friendly force and designating as a friendly location.

18. The system of claim 1 wherein said at least one enemy operational function is different for at least one of said plurality of predetermined spatial locations predesignated as said enemy target.

19. The system of claim 1 wherein said at least one friendly operational function is different for at least one of said plurality of predetermined spatial locations predesignated as said friendly target.

20. The method of claim 12 wherein the step of selecting said operational selection of at least one laser beam comprises emitting at least one laser beam comprising at least one wavelength corresponding to one of said at least one enemy operational function assigned to one of said plurality of predetermined spatial coordinates predesignated as said enemy target or said at least one friendly operational function assigned to another one of said plurality of predetermined spatial coordinates predesignated as said friendly target.

* * * * *